Sept. 17, 1929.  L. E. LA BRIE  1,728,618
BRAKE SHOE
Filed June 3, 1926  3 Sheets-Sheet 1

INVENTOR
LUDGER E. LA BRIE
BY
*M. W. McConkey*
ATTORNEY

Sept. 17, 1929.　　　L. E. LA BRIE　　　1,728,618
BRAKE SHOE
Filed June 3, 1926　　　3 Sheets-Sheet 2
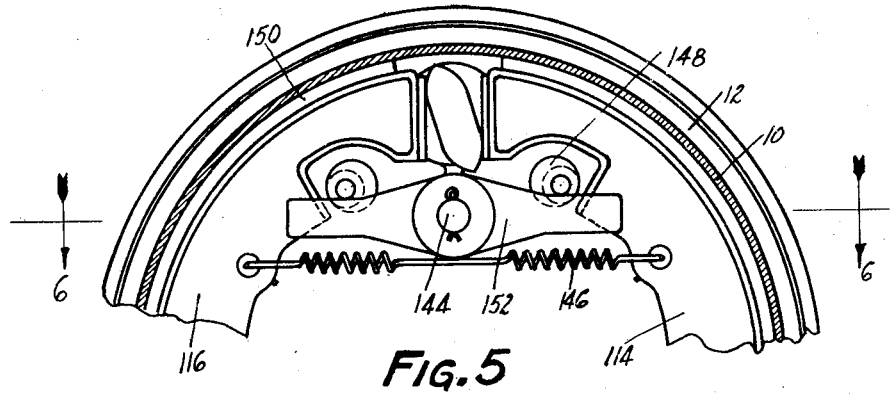
FIG.5
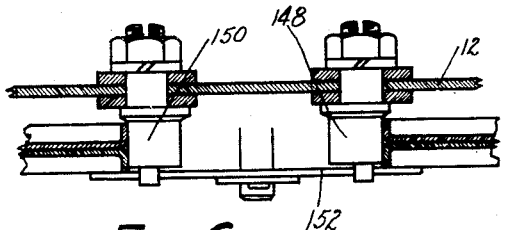
FIG.6
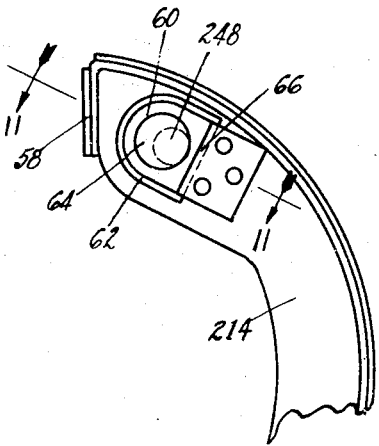
FIG.7
FIG.9.
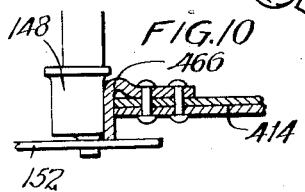
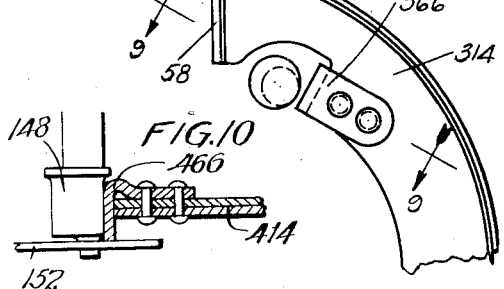
FIG.8
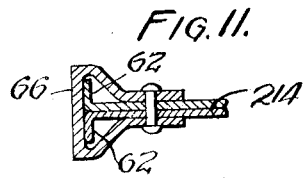
FIG.11.
INVENTOR
LUDGER E. LA BRIE
BY
M. W. McConkey
ATTORNEY Sept. 17, 1929.  L. E. LA BRIE  1,728,618
BRAKE SHOE
Filed June 3, 1926   3 Sheets-Sheet 3

INVENTOR.
Ludger E. LaBrie
BY
ATTORNEY

Patented Sept. 17, 1929

1,728,618

UNITED STATES PATENT OFFICE

LUDGER ELIZÉ LA BRIE, OF SOUTH BEND, INDIANA, ASSIGNOR TO BENDIX BRAKE COMPANY, OF CHICAGO, ILLINOIS, A CORPORATION OF ILLINOIS

BRAKE SHOE

Application filed June 3, 1926. Serial No. 113,366.

This invention relates to brakes and is illustrated as embodied in several internal expanding automobile brakes all operating on the general principal of a "double-wrapping" brake. An object of the invention is to provide strong and rigid but inexpensive shoes for a brake of this character.

Preferably the shoes are formed of sheet metal stampings secured back to back to form T-section shoes. Various features of novelty relate to the formation of anchor openings near the end of each shoe, and preferably provided with novel wear or thrust plates bridging across the ends of the cut-out portions of the stampings, to the formation of some cylindrical sockets at the opposite ends of the shoes to engage a pivot member, and to various other novel combinations of parts and desirable particular constructions which will be apparent from the following description of the various embodiments shown in the accompanying drawings, in which:

Figure 5 is a view corresponding to the upper part of Figure 1 but showing a different modification of the brake;

Figure 6 is a partial section on the line 6—6 of Figure 5 and showing the anchors;

Figure 7 is a partial side elevation showing the upper end of a third form of shoe which is interchangeable with the shoes of Figures 1 to 5;

Figure 8 is a similar view showing a fourth shoe;

Figure 9 is a partial section on the line 9—9 of Figure 8 showing the wear or thrust plate which engages the anchor;

Figure 10 is a view corresponding to Figure 9, but showing a different form of wear or thrust plate;

Figure 1:
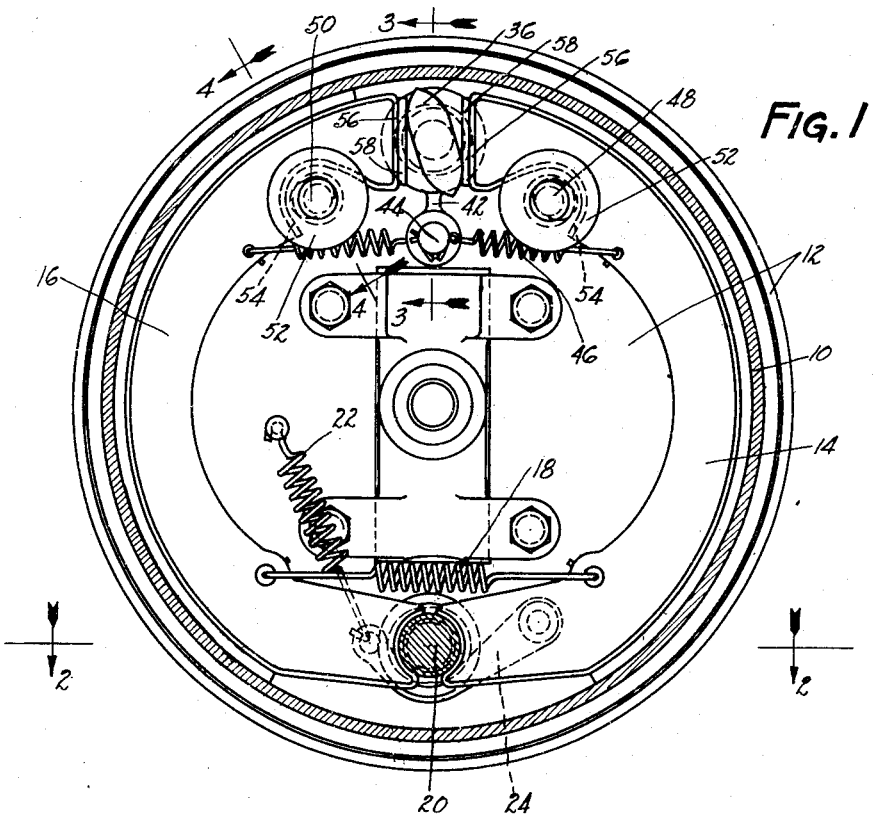
Figure 1 is a vertical section through one modification of the brake just inside the head of the brake drum, showing the shoes in side elevation.
Figure 12:
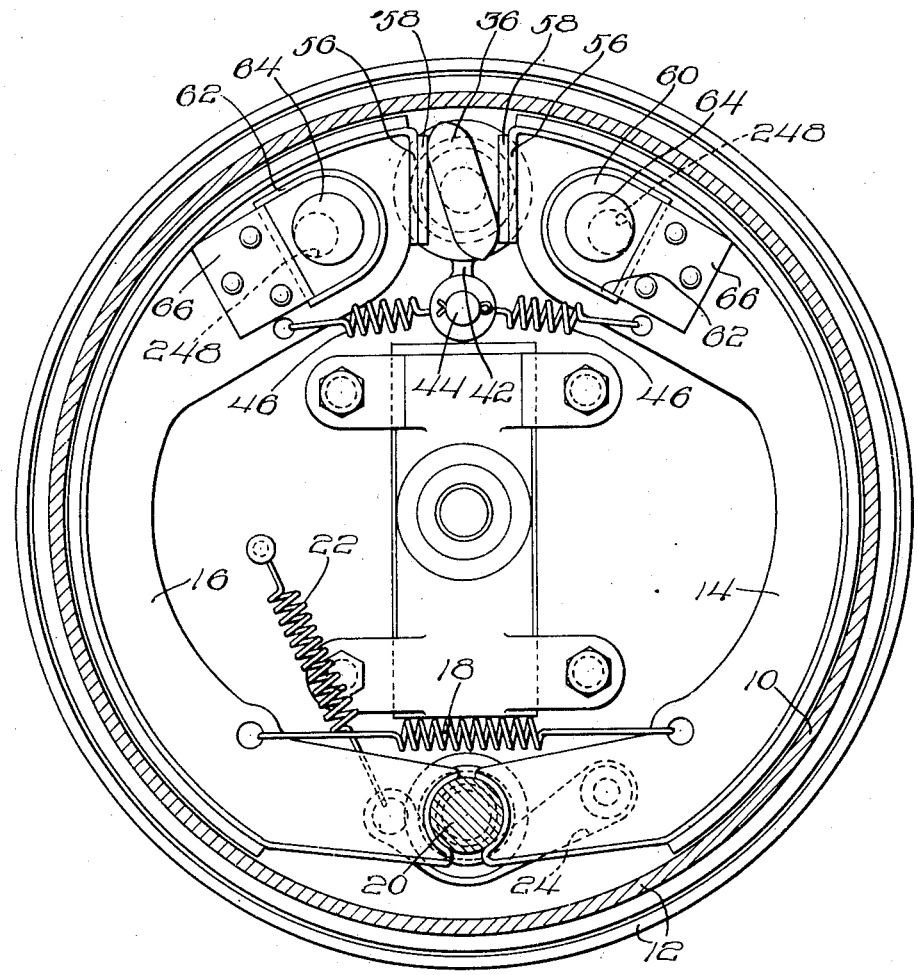

Figure 11 is a partial section on the line 11—11 of Figure 7, and corresponding to Figures 9 and 10 but showing the wear or thrust plate of the shoe of Figure 7; and Figure 12 is a view corresponding to Figure 1, but including the shoe of Figures 7 and 11.

Figure 2:
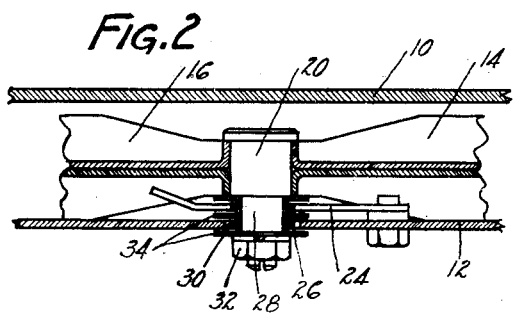
Figure 2 is a partial section on the line 2—2 of Figure 1, showing the pivotal connection between the shoes.

The brake of Figures 1-4 includes a drum 10, at the outer side of which there may be arranged a backing plate or other suitable support 12, and within which are arranged a plurality of brake shoes 14 and 16, one of which anchors when the drum is turning clockwise and the other of which anchors when the drum is turning counter-clockwise. Preferably each of these shoes is built up of two generally L-section sheet metal stampings secured together back to back, as will appear from a comparison of Figures 2 and 4 and which may be permanently fastened together by welding or riveting or in any other desired manner. At their lower ends the shoes are provided with semi-cylindrical sockets held by a spring 18 in engagement with opposite sides of a pivot member 20, by drawing out the metal of the webs of the stampings in opposite directions as shown in Figure 2. When the brake is released, the shoes are centered by a spring 22 connected to a lever 24 having double wedge surfaces embracing the bottom part of a roller 26 mounted on a reduced portion 28 of the pivot 20 which projects through a relatively large opening 30 in the backing plate 12. A nut 32 is threaded on the projecting end of a pivot to position washers 34 engaging opposite faces of the backing plate 12, to position the shoes laterally.

Figure 3:
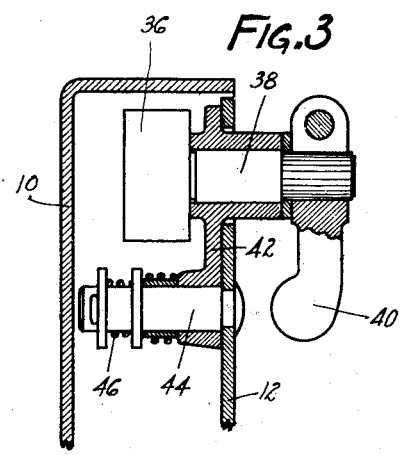
Figure 3 is a partial radial section on the line 3—3 of Figure 1, showing the brake-applying means.

The shoes are spread apart to apply the brake by suitable means such as a double cam 36 having a cam shaft 38 carrying an operating arm 40 and journalled in a bracket 42 pivotally mounted on a pin 44 carried by the backing plate 12. The cam 36 acts against the resistance of a return spring 46 connecting the shoes and having an intermediate portion engaging the pivot 44 as shown in Figure 3.

Figure 4:
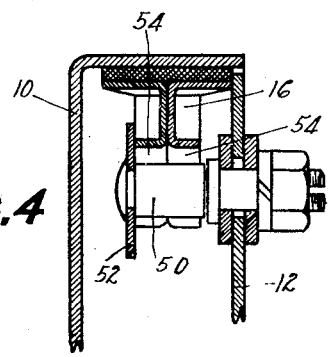
Figure 4 is a partial radial section on the line 4—4 of Figure 1, showing one of the anchors.

According to the direction of rotation of the brake drum the torque of the brake is taken on one of two adjustable eccentric anchors 48 and 50 secured to the backing plate 12 as shown in Figure 4 and having washers 52 confining the brake shoes laterally. According to one feature of the invention, the stiffening webs of the shoes are cut away or notched to form openings for the anchors 50, the metal of the two webs of the stampings being drawn in opposite directions to form thrust flanges 54 either directly engaging the anchor as shown in Figure 4 or provided with separate thrust members as described below, as will be apparent from Figure 1. The flanges 54 preferably extend entirely around the opening for each anchor, and are continued across the end of the shoe at 56 to form end flanges to which the cam thrust plates 58 are welded or otherwise secured, and which flanges 56 in turn form continuations of the cylindrical flanges forming the friction face of the shoe.

The arrangement shown in Figures 5 and 6 differs from that described above in that the return spring 146 does not engage the pivot 144, and in place of the washers 52 the pivot 144 carries an elongated plate 152 engaging sides of the shoes 114 and 116 to position them laterally and held by axial projections on the anchors 148 and 150 as shown in Figure 6.

The shoe 214 shown in Figure 11 differs from shoes 14 and 114 only in that the opening 60 for the anchor 248 extends through the stiffening web of the shoe instead of being in the form of a notch, and is reinforced by flanges 62 extending entirely around the opening and turned outwardly from the stamping forming the stiffening web of the shoe (see Figure 11). The anchor 248 is shown provided with a thrust part 64 sleeved upon the eccentric, and the shoe itself is shown with a novel wear or thrust member 66 projecting across the flanges 62 where they engage part 64 and turned backwardly at opposite sides of the shoe and riveted or otherwise secured to the sides of the stiffening web.

The shoe 314 of Figures 8 and 9 has the anchor opening in the form of a notch as in Figures 1 and 5, but is provided with a thrust or wear member 366 substantially like the wear member 66 in Figure 11. In shoe 414 of Figure 10 the thrust or wear part 466 only engages one side of the stiffening web of the shoe, and is then continued as a thrust flange across the ends of the flange making up the stiffening web so that the entire thrust or wear part is generally L-shaped in cross-section.

While illustrative embodiments have been described in detail, it is not my intention to limit the scope of the invention to those particular embodiments or otherwise than by the terms of the appended claims.

I claim:

1. A brake shoe comprising two parts, each having a cylindrical flange and a radial web, arranged back to back with the radial webs secured together to form a stiffening web and with the cylindrical flanges extending in opposite directions to form the friction face, the stiffening web being formed with an anchor opening a short distance from the end of the shoe, there being on each radial web an outwardly-extending flange at the end of the shoe to take the brake-applying thrust and around said opening to transmit thrust to the anchor.

2. A brake shoe comprising two parts, each having a cylindrical flange and a radial web, arranged back to back with the radial webs secured together to form a stiffening web and with the cylindrical flanges extending in opposite directions to form the friction face, the stiffening web being formed with an anchor opening a short distance from the end of the shoe, there being on each radial web an outwardly-extending flange around said opening to transmit thrust to the anchor.

3. A brake shoe comprising two parts, each having a cylindrical flange and a radial web, arranged back to back with the radial webs secured together to form a stiffening web and with the cylindrical flanges extending in opposite directions to form the friction face, the stiffening web being formed with an anchor opening a short distance from the end of the shoe, together with a separate thrust part bridging across the two radial webs in said opening to engage the anchor.

4. A brake shoe comprising two parts, each having a cylindrical flange and a radial web, arranged back to back with the radial webs secured together to form a stiffening web and with the cylindrical flanges extending in opposite directions to form the friction face, the stiffening web being formed with an anchor opening a short distance from the end of the shoe, together with a separate thrust part bridging across the two radial webs in said opening to engage the anchor, and continued down at least one side of the shoe and there secured to the shoe.

5. A brake shoe comprising two parts, each having a cylindrical flange and a radial web, arranged back to back with the radial webs secured together to form a stiffening web and with the cylindrical flanges extending in opposite directions to form the friction face, the stiffening web being formed with an anchor opening a short distance from the end of the shoe, together with a separate thrust part bridging across the two radial webs in said opening to engage the anchor, and continued down both sides of the shoe and there secured to the shoe.

6. A brake shoe having two radial reinforcing webs formed with anchor openings a short distance from the end of the shoe, there being on each radial web an outwardly-extending flange around said opening to transmit thrust to the anchor.

7. A brake shoe having two radial reinforcing webs formed with anchor openings a short distance from the end of the shoe, there being on each radial web an outwardly-extending flange around said opening to transmit thrust to the anchor, and along the end of the shoe to receive brake-applying thrust.

8. A brake shoe having two radial reinforcing webs formed with anchor openings a short distance from the end of the shoe, there being on each radial web an outwardly-extending flange around said opening to transmit thrust to the anchor, together with a wear member bridging across said outwardly-extending flanges to engage the anchor.

9. A brake shoe having between its edges two radial webs forming a stiffening web and cut away a short distance from the end of the shoe to form an anchor opening, together with a separate thrust part bridging across the webs at said opening to engage the anchor.

10. A brake shoe having between its edges two radial webs forming a stiffening web and cut away a short distance from the end of the shoe to form an anchor opening, together with a separate thrust part bridging across the webs at said opening to engage the anchor, and secured to the side of the shoe.

11. A brake shoe having between its edges two webs forming a stiffening web having a relatively large anchor opening therethrough, with each web drawn out to form an outwardly-directed flange extending continuously around said opening.

In testimony whereof, I have hereunto signed my name.

LUDGER ELIZÉ LA BRIE.